Figure 1:
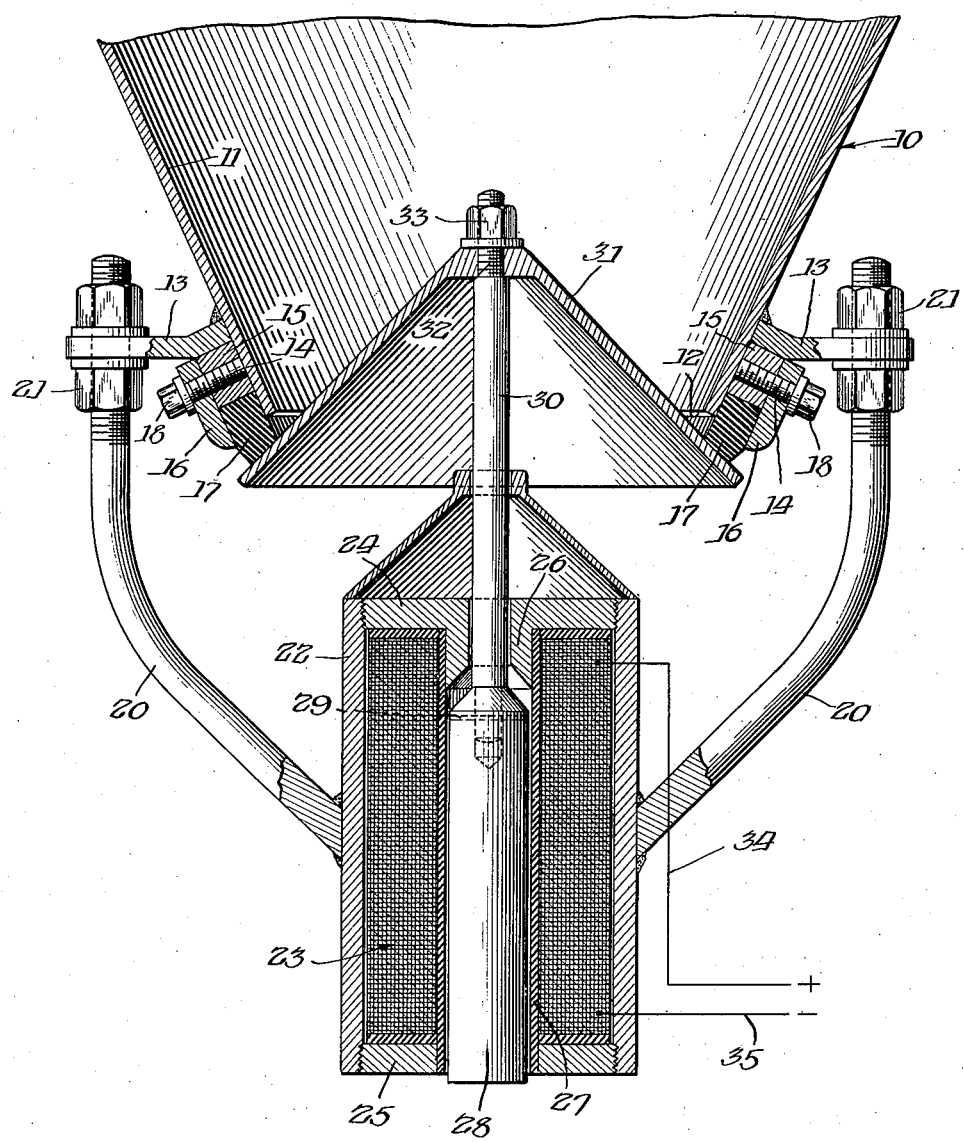

July 18, 1939.  A. G. CARLSON  2,166,484
HOPPER CLOSURE MECHANISM
Filed Sept. 13, 1937  2 Sheets-Sheet 1

Inventor:
Adolph G. Carlson
By Yuma & Rauber
Attys.

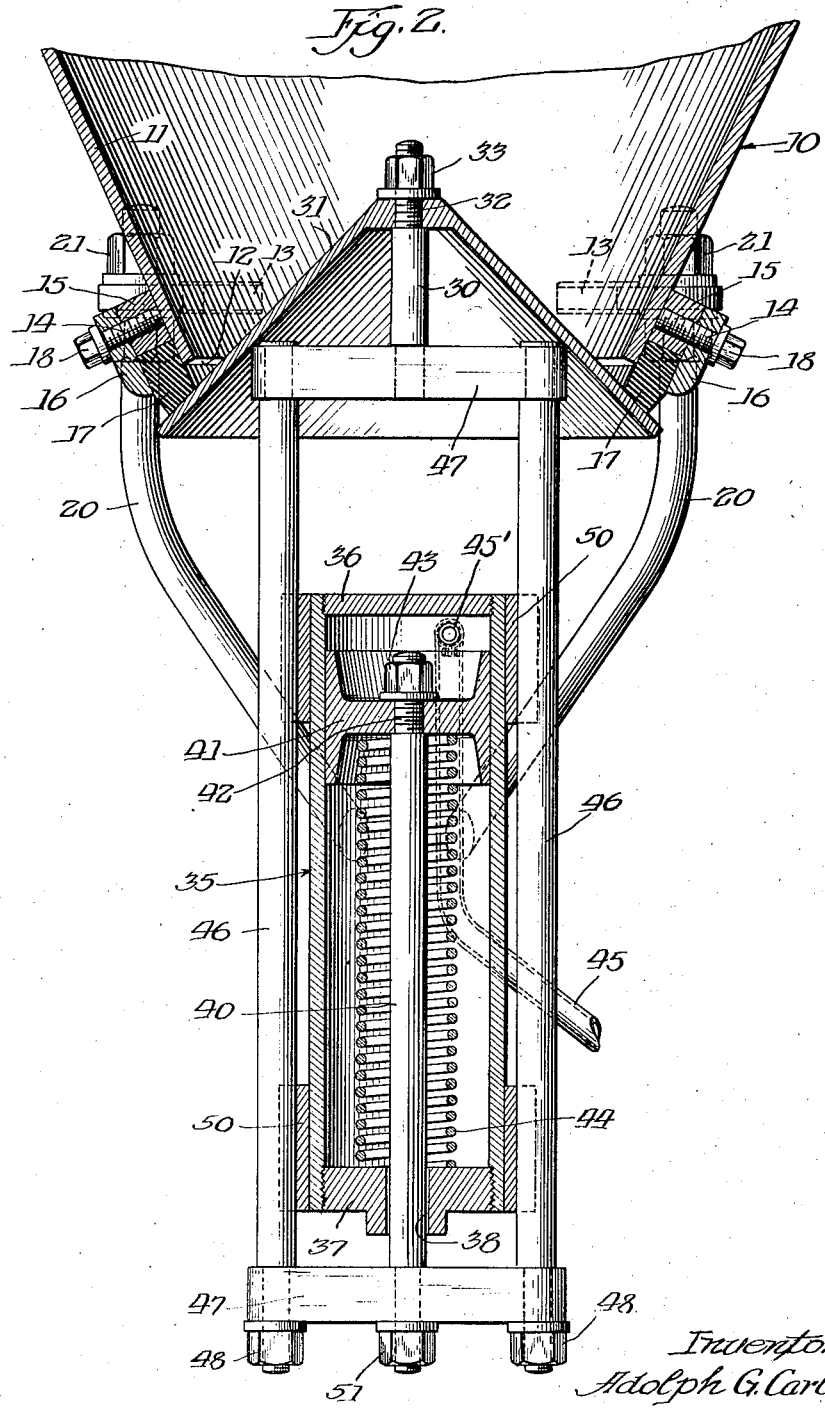

Patented July 18, 1939

2,166,484

UNITED STATES PATENT OFFICE 2,166,484

HOPPER CLOSURE MECHANISM

Adolph G. Carlson, Chicago, Ill.

Application September 13, 1937, Serial No. 163,689

2 Claims. (Cl. 221—145)

The invention relates to bottom closing means for hoppers and the like and has for an object to provide apparatus of simple construction which will operate efficiently as a releasable bottom for hoppers, effecting a tight and secure closure but which may be instantly released to discharge the entire contents thereof.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a vertical sectional view illustrating the improvements of the invention; and Figure 2 is a vertical sectional view showing a modified form of closing means for hoppers and the like.

Referring to the drawings, particularly Figure 1, a conventional hopper is indicated by numeral 10. Said hopper may form part of a machine, not shown, such as a weighing machine, it being understood that the hopper is supplied with a charge of material such as cement or other similar finely divided material and which is to be retained within the hopper until the bottom closure member is actuated to discharge the contents thereof. The hopper, which may be provided with a lining of stainless steel 11, has suitably welded to its exterior adjacent the opening 12 a plurality of supporting lugs 13. Also extending from the lower end of the hopper some distance below the lugs 13 are a plurality of screws 14 which receive successively the washers 15 and the retaining ring 16. As a result of the washers the retaining ring is spaced from the exterior wall of the hopper 10 although the same is supported with its inner surface parallel to the hopper since the screws 14 project at an angle normal to the hopper wall. The structure provides securing means by which the rubber ring 17 is retained in its proper location with respect to the open bottom 12 of the hopper. The nuts 18 which are threaded to the projecting ends of the screws 14 firmly clamp the rubber ring 17 between the hopper wall and the retaining ring 16.

The lugs 13 support the depending arms 20 having threaded upper ends which extend through openings in said lugs, being retained in proper position vertically by means of the adjusting nuts 21. The lower ends of the depending arms 20 converge inwardly and are suitably welded to the housing 22 of the solenoid indicated by numeral 23. The solenoid is confined within the housing by means of the end members 24 and 25, respectively, the member 24 having a depending portion 26 extending for a short distance within the bore formed by the tube 27. Adapted to have longitudinal movement within the tube 27 is an armature or core 28 having the rod 30 secured to its upper end by the pin 29, which rod forms the support for the cone-shaped closure 31. The upper end 32 of the rod 30 is reduced and threaded for receiving the closure member 31 which is retained thereon by the securing nut 33.

The solenoid 23 is energized by connecting the wires 34 and 35 to a suitable source of current. As long as the solenoid remains energized the armature 28 will be attracted thereby and the closure member 31 will be held in position against the rubber ring 17, closing the bottom opening of the hopper. The position of the armature within the solenoid when the closure member initially contacts the rubber ring is such as to maintain a pressure against said rubber ring as long as the solenoid remains energized, thus maintaining a tight and secure closure for the hopper, which, however, can be instantly released by deenergizing the solenoid to discharge the entire contents of the hopper.

In the modification shown in Figure 2 the hopper closure member is actuated in a downward direction for discharging purposes by an air cylinder, being yieldingly held in its upper position against the rubber ring 17 by a coil spring. The depending supporting arms 20 converge inwardly as described with respect to Figure 1 and are secured as by welding to the tubular housing 35 having end members 36 and 37, respectively. Member 37 is provided with the central opening 38 for the passage of the rod 40 to which is secured at the upper end thereof the piston 41. Rod 40 is reduced at 42 for receiving said piston which is retained thereon by the securing nut 43. A coil spring 44 is confined between the piston and the end member 37 and accordingly said spring yieldingly forces the piston in a direction upwardly, thus normally locating the piston in the upper part of the cylinder 35. Cylinder 35 connects with the air supply pipe 46 which enters the cylinder at the extreme upper end thereof as at 45', which is above the uppermost position of the piston and as a result admission of air to the cylinder will tend to force the piston in a downward direction.

In this modification the cone-shaped hopper closure member 31 is secured by the rod 30 to a frame consisting of vertical rods 46 connected at their respective ends by cross pieces 47. The securing nuts 48 serve to hold the assembly together. Members 50 suitably secured to the exterior wall of the cylinder 35 form guides for guiding the rods 46 in their vertical movement.

The frame consisting of the vertical rods 46 connected at their ends by cross pieces 47 has movement conforming to that of the piston 41 since the piston rod 40 is suitably connected centrally of the lower cross piece 47. The lower end of said connecting rod is reduced in diameter which reduced end is threaded for receiving said lower cross piece and which is retained on said rod by the nut 51. In the operation of the device the frame and hopper closure member is yieldingly forced in an upward direction by the action of the coil spring 44. This serves to hold the closure member in firm contact with the rubber ring 17, maintaining a tight and secure closure for the hopper. When it is desired to discharge the contents of the hopper air is admitted to the cylinder 35 by the air supply line 45. The air which is under pressure fills the space above piston 41, forcing the same downwardly against the tension of spring 44, thereby opening the hopper bottom to cause discharge of the entire contents thereof. This opening action of the hopper closure member 31 is facilitated by the weight of the contents within the hopper which rests on the said cone-shaped member. To return the member 31 to closing position it is only necessary to exhaust the air from the cylinder 35 through pipe 45. The coil spring 44 will then be effective to force the piston, the connecting frame and the member 31 into their uppermost positions, whereupon the member 31 will be held against the rubber ring 17, closing the bottom opening of the hopper.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a hopper, in combination, a member for closing the open bottom of said hopper, actuating means for said member to produce opening and closing movement thereof, comprising a cylinder located below the hopper, depending arms supporting said cylinder from the hopper, a piston within said cylinder having connection with the bottom closing member whereby movement of the piston is imparted to said member, resilient means within said cylinder forcing said piston in a direction upwardly to retain the bottom member in its hopper closing position, and an air supply for said cylinder forcing said piston in a direction downwardly to cause opening of the hopper.

2. In a hopper, in combination, a member for closing the open bottom of said hopper, actuating means for said member to produce opening and closing movement thereof, comprising an air cylinder supported below said hopper centrally of the bottom opening thereof, a piston within said cylinder adapted to be forced in a direction downwardly upon the admission of air to said cylinder, resilient means for yieldingly biasing said piston in a direction upwardly, means connecting said piston with the bottom closing member comprising a rectangular frame, and members fixed to said air cylinder for guiding said frame in its vertical movement.

ADOLPH G. CARLSON.